(12) United States Patent
Sayegh et al.

(10) Patent No.: US 8,570,174 B2
(45) Date of Patent: Oct. 29, 2013

(54) PIN ALARM TAG

(76) Inventors: Adel O. Sayegh, Rancho Cucamonga, CA (US); Edgardo Redublo, Chino Hills, CA (US); Weiliang Tong, Hangzhou (CN); Mingxing Chen, Hangzhou (CN)

( * ) Notice: Subject to any disclaimer, the term of this patent is extended or adjusted under 35 U.S.C. 154(b) by 399 days.

(21) Appl. No.: 12/790,914

(22) Filed: May 31, 2010

(65) Prior Publication Data

US 2011/0273295 A1    Nov. 10, 2011

Related U.S. Application Data

(60) Provisional application No. 61/183,058, filed on Jun. 1, 2009.

(51) Int. Cl.
*G08B 13/14*    (2006.01)
(52) U.S. Cl.
USPC ..................... 340/572.1; 340/572.9
(58) Field of Classification Search
USPC ....................................................... 340/572.1
See application file for complete search history.

(56) References Cited

U.S. PATENT DOCUMENTS

| | | | | |
|---|---|---|---|---|
| 6,535,130 | B2 * | 3/2003 | Nguyen et al. | 340/572.9 |
| 2005/0264424 | A1 * | 12/2005 | Holmgren | 340/572.9 |
| 2005/0270155 | A1 * | 12/2005 | Sayegh | 340/572.1 |
| 2006/0244616 | A1 * | 11/2006 | Hill | 340/604 |
| 2008/0094256 | A1 * | 4/2008 | Koen | 340/988 |

* cited by examiner

*Primary Examiner* — Brian A Zimmerman
*Assistant Examiner* — Cal Eustaquio
(74) *Attorney, Agent, or Firm* — Milord A. Keshishian

(57) ABSTRACT

An alarm tag comprising a first input unit for generating signals for setting (to ON) or resetting (to OFF) an alarm system of the alarm tag. The alarm tag further includes a second input unit for generating signals for arming the alarm tag and triggering an alarm, and an independent auxiliary input unit that generates independent signals that arm the alarm tag and trigger an alarm. When both the second and the auxiliary input units generate a first signal, the alarm system of the alarm tag is armed and set to ON, and when any of the second and third auxiliary input units generate a second signal while the alarm tag is armed and ON, the alarm system of the alarm tag triggers an alarm, thereby preventing tampering and bypassing of one of the second and auxiliary input units to disarm the alarm.

24 Claims, 15 Drawing Sheets

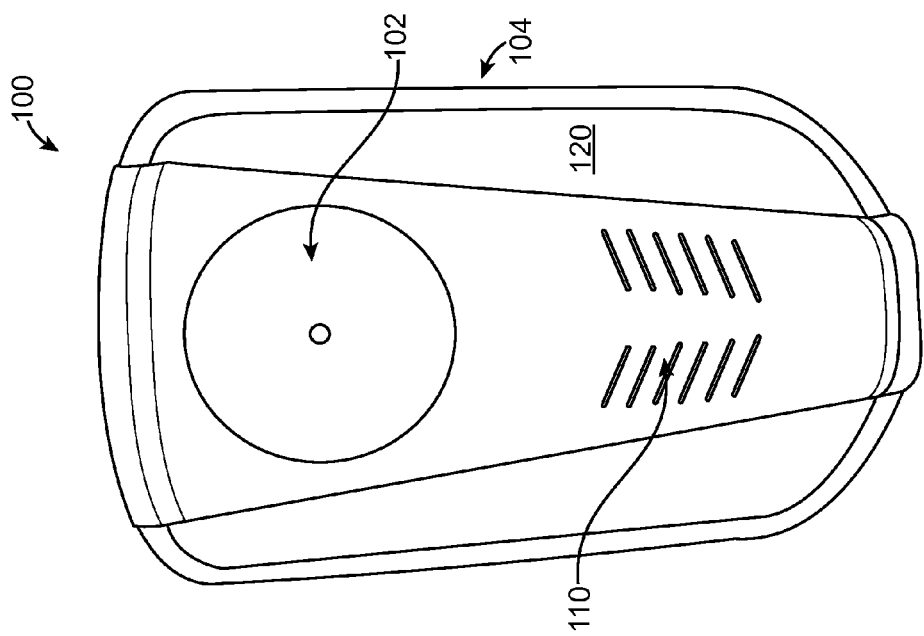
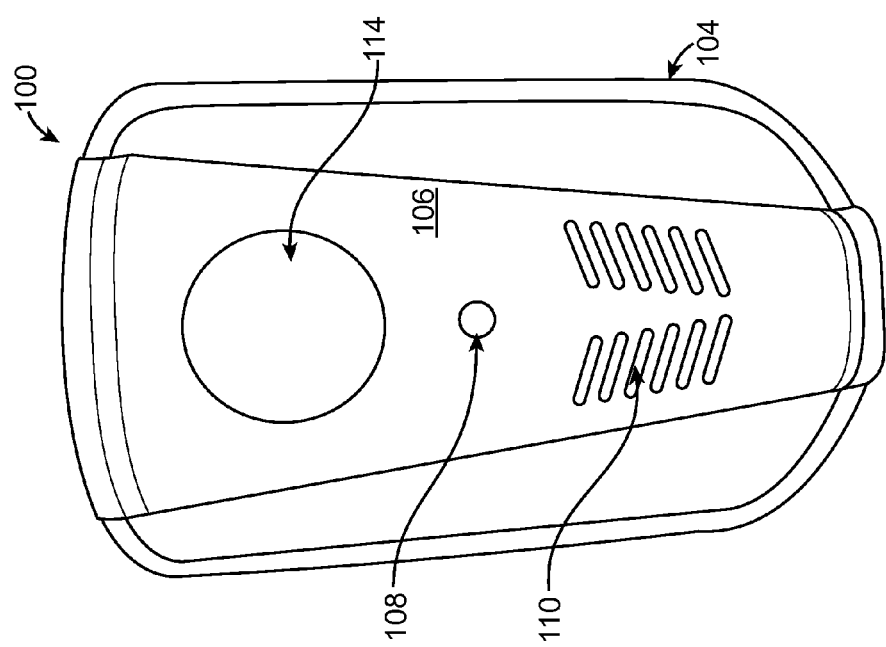

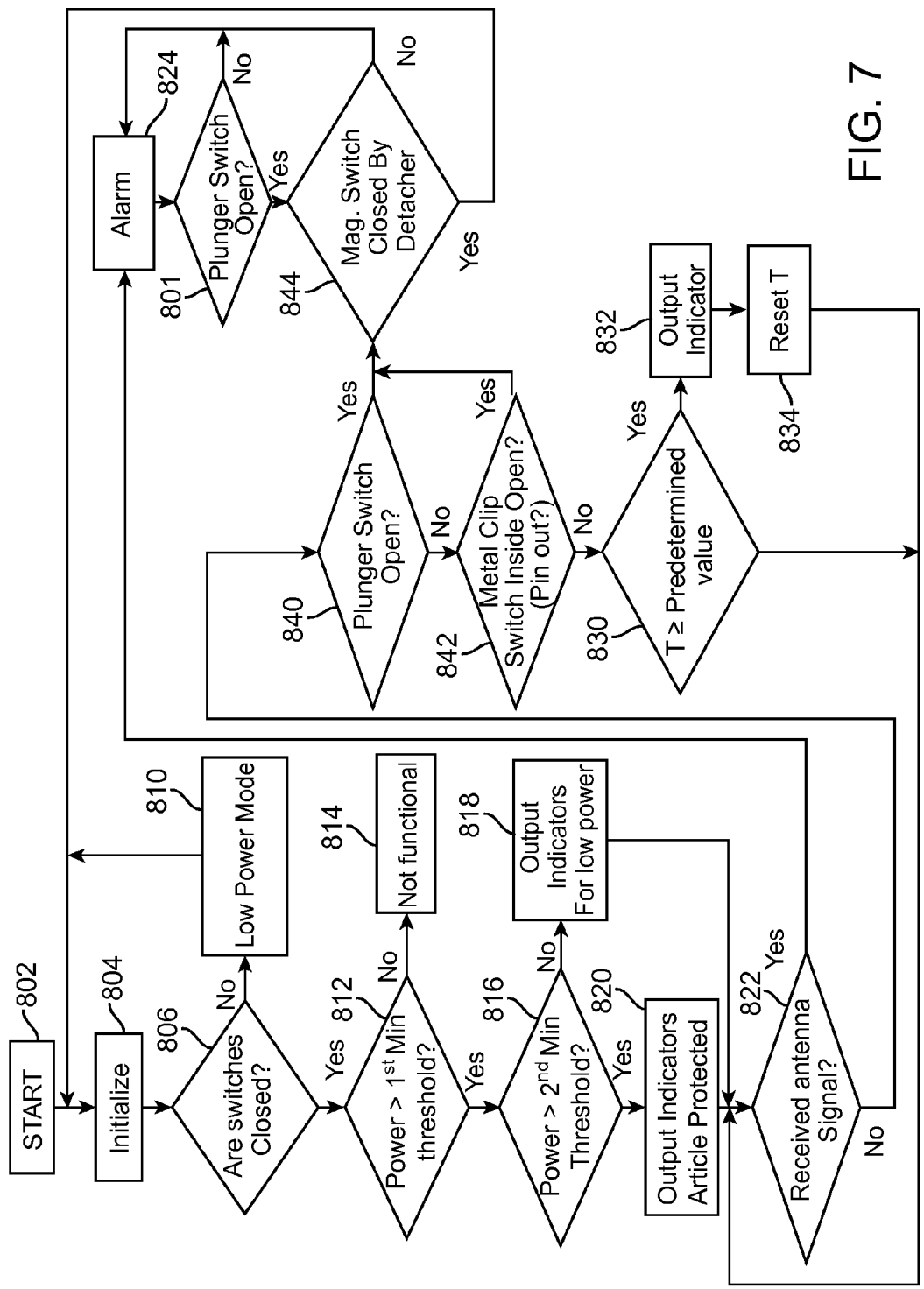

PIN ALARM TAG

CROSS-REFERENCE TO RELATED APPLICATIONS

This Application claims the benefit of priority of the co-pending U.S. Utility Provisional Patent Application No. 61/183,058, filed Jun. 1, 2009, the entire disclosure of which is expressly incorporated by reference herein.

BACKGROUND OF THE INVENTION (1) Field of the Invention

This invention relates to electronic article surveillance and, more particularly to pin alarm tags with an auxiliary alarm triggering mechanism.

(2) Description of Related Art

Most convention alarm tags include a pin that couples an article to the alarm tag. These types of conventional alarm tags can easily be tampered with to circumvent the pin connection with the alarm tag. That is, for example, the pin itself may be physically cut from outside the alarm tag to disconnect the alarm tag from the article to which the tag is coupled, without actually, fully removing the pin out from the alarm tag. State otherwise, a lower portion of the pin will physically remain within the inside of the alarm tag housing, with an electrical alarm circuit remained closed while an upper section of the pin that is extended outside the alarm tag housing that connects the article to be protected with the alarm tag is cut, releasing the article without trigger an alarm.

Accordingly, in light of the current state of the art and the drawbacks to current alarm tags mentioned above, there remains a long standing and continuing need for an advance in the art of EAS and theft deterrent tags that makes the tags more difficult to defeat while providing a secure and reliable engagement of the article to be monitored.

BRIEF SUMMARY OF THE INVENTION

An exemplary optional aspect of the present invention provides an alarm tag, comprising:
 a first switch for resetting an alarm system of the alarm tag to OFF;
 a second switch and a third auxiliary switch, and
 a triggering unit that senses and detects surveillance signals to generate a detected surveillance signal that triggers an alarm; and
 when both the second and third auxiliary switches are actuated the alarm system of the alarm tag is armed and set to ON; and
 when any of the second and third auxiliary switch is deactivated while the alarm tag is armed and ON, the alarm system of the alarm tag activates an alarm, thereby preventing bypassing of one of the second and third switch to disarm the alarm.

Another exemplary optional aspect of the present invention provides an alarm tag, wherein:
 the second switch is activated by a fastener that secures an article to the alarm tag.

Still another exemplary optional aspect of the present invention provides an alarm tag, wherein:
 the fastener includes a grip portion to enable a handling of the fastener, and a fastener end that is inserted through an article and inserted through an aperture of the alarm tag, interlocking the article with the alarm tag, with the fastener end coupled with a first contact mechanism that is electrically coupled with the alarm system of the alarm tag, the combination of which form a closed switch that completes a circuit for setting the alarm system of the alarm tag.

A further exemplary optional aspect of the present invention provides an alarm tag, wherein:
 the fastener end couples within a lock of the alarm tag comprised of:
 a housing having small top section with an aperture for receiving the fastener end;
 oblique walls that slope and coupled the small top section to a larger bottom section, forming a substantially cone configured housing;
 the housing includes:
 metal pieces that are biased to the small top section by a biasing mechanism, with the biasing mechanism located at the larger bottom section that pushes the metal pieces toward the small top section, forcing the metal pieces to touch;
 the fastener end of the fastener when inserted within the aperture moves the metal pieces away from each other and towards the sloped walls of the housing, which compel and direct the metal pieces down against the biasing mechanism toward the larger bottom section, with the metal pieces pushed and biased against the fastener end of the fastener, securely maintaining and locking the fastener end therein frictionally.

Still a further exemplary optional aspect of the present invention provides an alarm tag, wherein:
 the metal pieces are forced toward the larger bottom section of the housing by a magnetic, moving the metal pieces away from the tip, reducing the frictional grip of the metal pieces with the tip to enable removal and release of the fastener.

Another exemplary optional aspect of the present invention provides an alarm tag, wherein:
 the metal pieces are ball bearings within a metal cylinder that holds the ball bearings symmetrically in place.

Yet another exemplary optional aspect of the present invention provides an alarm tag, wherein:
 the first contact mechanism is a receptacle and is comprised of a first contact and a second contact that are separated by a gap that accommodates the fastener, and when inserted, the fastener closes the gap between the first and the second contacts to set the alarm.

Still another exemplary optional aspect of the present invention provides an alarm tag, wherein:
 the first and the second contacts have an axial length that longitudinally is substantially parabolic, with a base of the contacts facing one another.

A further exemplary optional aspect of the present invention provides an alarm tag, wherein:
 the third auxiliary switch is actuated in conjunction with the second switch to a closed position, which completes a circuit for arming the alarm system of the alarm tag.

Still another exemplary optional aspect of the present invention provides an alarm tag, wherein:
 the first switch is a magnetic switch that when closed, resets and disarms the alarm if the second switch and the third auxiliary switch are open.

A further exemplary optional aspect of the present invention provides an alarm tag, wherein:
 the triggering unit is a signal detector that senses a surveillance signal and triggers the alarm system upon detecting the surveillance signal if the first switch is open and the second and third auxiliary switches are closed.

Another exemplary optional aspect of the present invention provides an alarm tag, wherein:
the signal detector is a ferrite coil, and the surveillance signal is a magnetic signal that is detected by the ferrite coil.

Another exemplary optional aspect of the present invention provides an alarm system for an alarm tag, comprising:
a first input unit for resetting the alarm system;
a second input unit for coupling an article with the alarm tag and arming the alarm tag; and
an auxiliary input unit that is independent of the first and the second input units, but set in conjunction with the second input unit to one of a first and second condition;
a triggering unit that senses and detects surveillance signals to generate a detected surveillance signal that triggers an alarm; and
wherein when both the second input unit and the auxiliary input unit are set to the first condition, the alarm system of the alarm tag is armed and set to ON; and
wherein when any of the second input unit and the auxiliary input unit is set to the second condition while the alarm tag is armed and ON, the alarm system of the alarm tag triggers an alarm.

Yet another exemplary optional aspect of the present invention provides an alarm system for an alarm tag, wherein:
setting the second input unit to the first condition automatically sets the auxiliary input unit to the first condition, and setting the second input unit to a second condition sets the auxiliary input unit to the second condition.

Still another exemplary optional aspect of the present invention provides an alarm system for an alarm tag, further comprising:
a microprocessor that receives input signals from the first, the second, and the auxiliary input units, and a fourth input unit, and generates output signals that actuate one or more output units.

A further exemplary optional aspect of the present invention provides an alarm system for an alarm tag, wherein:
the first input unit is a first sensor switch that outputs a first signal when closed to reset and disarm the alarm tag and generates a second signal when open to maintain status quo;
the second input unit is an interlock sensor switch that outputs a third signal when closed, coupling an article with the alarm tag and arming the alarm tag, and generates a fourth signal when open to trigger an alarm;
the auxiliary input unit is an auxiliary sensor switch that outputs a fifth signal when closed to arm the alarm tag, and generates a sixth signal when open to trigger an alarm; and
the fourth input unit is a triggering unit that generates a seventh signal to trigger an alarm.

Still a further exemplary optional aspect of the present invention provides an alarm system for an alarm tag, wherein:
the triggering unit is a ferrite coil that detects a magnetic surveillance signal and generates the seventh signal for triggering an alarm if the second and auxiliary input units are closed.

Another exemplary optional aspect of the present invention provides an alarm system for an alarm tag, wherein:
the seventh signal is amplified by an amplifier for further processing.

Yet another exemplary optional aspect of the present invention provides an alarm system for an alarm tag, wherein:
the microprocessor is initialized when the first signal is received.

Another exemplary optional aspect of the present invention provides an alarm system for an alarm tag, comprising:
a first sensor switch for resetting the alarm system of the alarm tag to OFF;
a second interlocking sensor switch for coupling an article with the alarm tag and arming the alarm tag; and
a third auxiliary sensor switch that is independent of the first sensor switch and the second interlocking sensor switch, but set in conjunction with the second interlocking sensor switch to arm the alarm tag;
wherein when both the second interlock sensor switch and the third auxiliary sensor switches are closed, the alarm system of the alarm tag is armed and set to ON; and
wherein if the second interlocking sensor switch is tampered, the third auxiliary sensor switch opens to trigger the alarm.

Still another exemplary optional aspect of the present invention provides an alarm system for an alarm tag, wherein:
closing of the second interlocking sensor switch automatically closes the third auxiliary sensor switch to arm the alarm tag, and tampering with the second interlocking sensor switch opens the third auxiliary sensor switch.

Another exemplary optional aspect of the present invention provides a method for power management of an alarm, comprising:
providing input signals and determining if the input signals meet a predetermined condition;
if the input signals do not meet the predetermined condition, generating a low power mode operational signal to thereby reduce power usage;
if the input signals do meet the predetermined condition, then determining if a supplied power is greater than a first threshold;
if the supplied power is not greater then the first threshold, ceasing the operation of the alarm; otherwise, determining if supplied power is greater than a second threshold;
if the supplied power is not greater than a second threshold, outputting a low power supply indicator and arming the alarm; otherwise, generating indicators that the alarm is armed.

Still another exemplary optional aspect of the present invention provides a method for power management of an alarm, further comprising:
determining if an antenna signal is received for triggering an alarm;
if an antenna signal is not received, determining if two of the input signals meet the predetermined condition and if so, periodically generating an indicator at specified time intervals that the alarm is armed;
if any one of the two of the input signals do not meet the predetermined condition, determining if another of the input signals meets the predetermined condition and if so, resetting the alarm, otherwise, triggering the alarm;
if an antenna signal is received, triggering an alarm and determining if one of the input signals meets the predetermined condition and if so, determining if another of the input signals meets the predetermined condition, and if so resetting the alarm, otherwise, triggering the alarm.

Another exemplary optional aspect of the present invention provides an alarm system for an alarm tag, comprising:
a plurality of input units associated with a corresponding plurality of independent mechanical and electrical circuitry, including:
a first input unit that outputs a first signal to reset and disarm the alarm tag and generates a second signal to maintain status quo, with the first and second signals processed through a first independent mechanical and electrical circuitry;

a second input unit that outputs a third signal to arm the alarm tag, and generates a fourth signal to trigger an alarm, with the third and fourth signals processed through a second mechanical and electrical circuitry;

a third input unit that outputs a fifth signal to arm the alarm tag, and generates a sixth signal to trigger an alarm; with the fifth and sixth signal processed through a third mechanical and electrical circuitry; and a fourth input unit that generates a seventh signal to trigger an alarm, with the seventh signal processed through a fourth mechanical and electrical circuitry.

Yet another exemplary optional aspect of the present invention an alarm system for an alarm tag, wherein:

the first input unit is a first sensor switch, comprised of a magnetic switch;

the second input unit is an interlocking sensor switch;

the third input unit is an inconspicuous auxiliary switch that is set in conjunction with the interlocking sensor switch to arm the alarm tag; and the fourth input unit is a triggering unit that senses and detects surveillance signals to generate the seventh signal that triggers an alarm; and wherein when both the interlock sensor switch and the auxiliary switch are closed, the alarm system of the alarm tag is armed and set to ON; and wherein if the interlocking sensor switch is tampered, the auxiliary switch opens to trigger the alarm.

Another exemplary optional aspect of the present invention provides an alarm The alarm tag, wherein:

a radial protrusion of an underneath surface of the grip section is fully inserted and housed inside a cavity, surrounded by periphery wall that protects the fastener plug member against tampering.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout:

FIGS. 1A and 1B are exemplary illustrations of a first and second sides of a pin alarm tag in accordance with the present invention;

FIG. 7 is an exemplary illustration of a flow chart, which illustrates a power management and functionality of the alarm tag of FIGS. 1A to 6B in accordance with the present invention.

DETAILED DESCRIPTION OF THE INVENTION

Figure 2B:
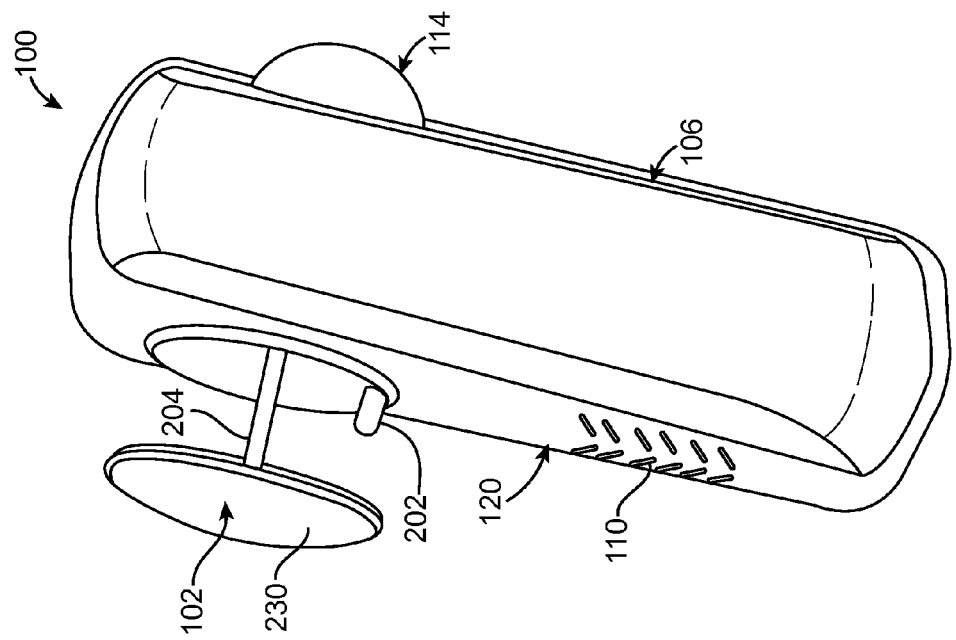
FIGS. 2A and 2B are exemplary illustrations of the pin alarm tag of FIGS. 1A and 1B, progressively illustrating the removal of a fastener plug mechanism and an opening of an inconspicuous auxiliary arming switch in accordance with the present invention.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within an illustrated flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

The present invention provides an improved alarm tag that includes a first switch for resetting an alarm system of the alarm tag to OFF, a second switch that is a fastener that secures an article to the alarm tag and when closed, arms the alarming system of the tag and activates an inconspicuous auxiliary third arming switch that is used to independently arm the alarming system of the tag (in conjunction with the second switch). When both the second and third switches are actuated, the alarm system of the alarm tag is armed and set to ON; and when one of the second and third switch is deactivated (e.g., opened) while the alarm tag is armed and ON, the alarm system of the alarm tag activates (or triggers) an alarm, thereby preventing potential bypass or circumvention of one of the second and third switch to disarm the alarm. Stated otherwise, the inconspicuous auxiliary switch may trigger an alarm if the second switch is tampered. Accordingly, the present invention provides a theft deterrent tag that is difficult to defeat, while providing a secure and reliable engagement of the article to be monitored.

Referring to FIGS. 1A and 1B, the present invention provides a pin alarm tag 100 having a fastener plug member 102 (the second switch) that is coupled with a housing 104 of the pin alarm tag 100. The housing 104 of the pin alarm tag 100 includes a first member 106 coupled with a second member 120, forming a hollow internal chamber within which is mounted an alarm system. The first member 106 includes a visual indicator aperture for viewing of a visual indicator device 108 and a protuberance 114 that houses a lock mechanism 306 (FIG. 4) for locking the fastener plug member 102. The second member 120 includes an aperture 206 (FIG. 2E) for accommodating the fastener plug member 102. The first member 106 and the second member 120 include perforated areas that form the grill-openings 110 of the housing 104 for output of an audio indicator sound. To release an article, deactivate, and reset the alarm to OFF, alarm tag 100 is brought into contact with well-known suitable (in terms of magnetic strength, for example) magnetic detacher that resets an internal magnetic switch 605 (FIG. 5E) within the pin alarm tag 100, enables the release and removal of the fastener plug member 102, and the overall disarming of the pin alarm tag 100.

Figure 2A:
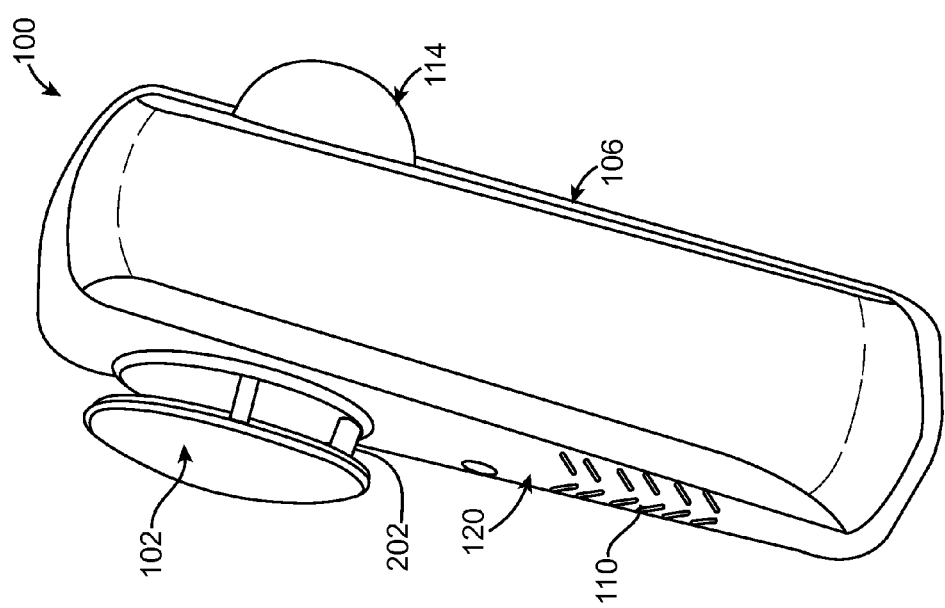
Figure 2D:
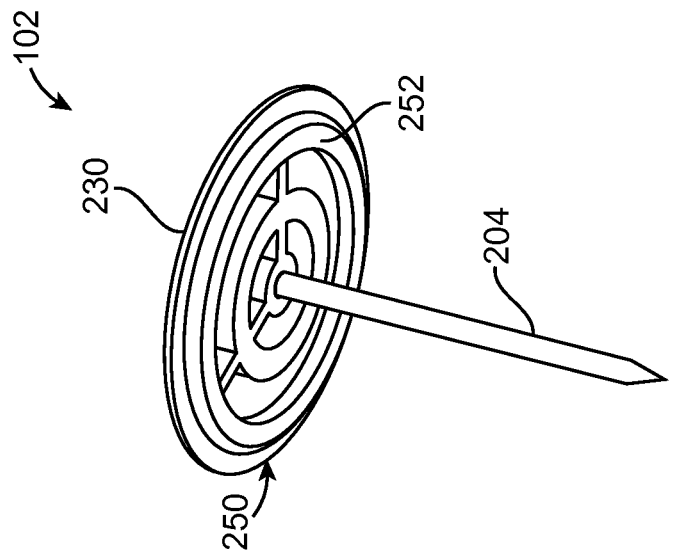
FIGS. 2C and 2D are exemplary illustrations of a fastener plug mechanism in accordance with the present invention.
Figure 2C:
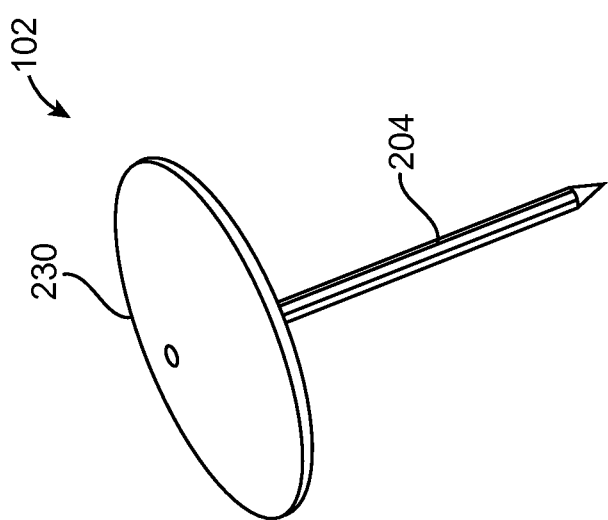
Figure 2E:
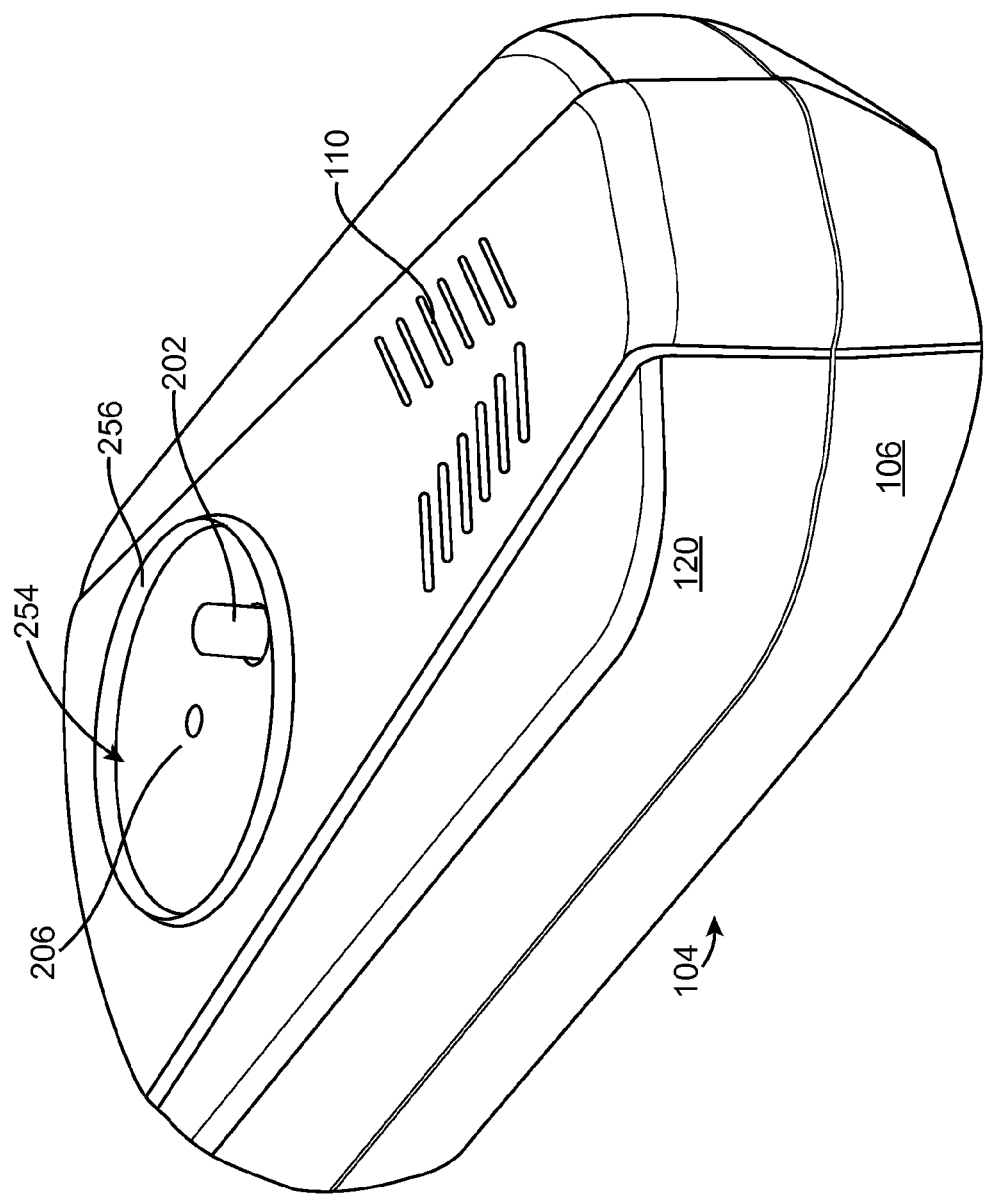
FIG. 2E is an exemplary illustration of the pin alarm tag of FIGS. 1A to 2D, with the fastener plug mechanisms unplugged and removed and the inconspicuous auxiliary switch in a fully open position in accordance with the present invention.

FIGS. 2A and 2B are exemplary illustrations of the pin alarm tag of FIGS. 1A and 1B, progressively illustrating the removal of a fastener plug mechanism 102 and an opening of an inconspicuous auxiliary arming switch 202 in accordance with the present invention. FIGS. 2C and 2D are exemplary illustrations of the fastener plug mechanism 102 in accordance with the present invention, and FIG. 2E is an exemplary illustration of the pin alarm tag 100 of FIGS. 1A to 2D, with the fastener plug mechanisms 102 unplugged and removed and the inconspicuous auxiliary switch 202 in a fully open position in accordance with the present invention. As stated above, the magnetic detacher resets (or closes) the internal magnetic switch 605 (FIG. 5F) and enables the fastener plug member 102 to be removed from the housing 104 of the pin alarm tag 100 without triggering an alarm. As best illustrated in FIGS. 2C and 2D, the fastener plug member 102 includes a grip portion 230 to enable a handling of the fastener, and a fastener end 204 that is inserted through an article (not shown) and inserted through an aperture 206 (FIG. 2E) of the pin alarm tag 100. The fastener end 204 interlocks the article (not shown) with the alarm tag 100, with the fastener end 204 coupled with the pin alarm tag 100 to set (or arm) the alarm system therein. The shape, size, and physical features of the fastener plug member 102 may be varied.

As further illustrated in FIGS. 2A to 2E, the alarm tag 100 further includes the switch 202 (the auxiliary switch, detailed below) that is set (or closed) in combination with the fastener plug member 102 to set the alarm system of the pin alarm tag 100. That is, in use, when the fastener plug member 102 is inserted through the article (not shown) and inserted through the aperture 206, as it is further pressed, the bottom, underneath surface 250 of the grip section 230 contacts and presses against the article, which, in turn, contacts and presses against the switch 202 (best illustrated in FIGS. 2A and 2B), which is normally biased to a protruded up and out position, interlocking the article with the pin alarm tag 100. More specifically, a radial protrusion 252 of the bottom, underneath surface 250 of the grip section 230 physically contacts the article that in turn, contacts the switch 202 to thereby activate (or close) this inconspicuous auxiliary alarming switch 202. This way, both the fastener plug member 102 and the switch 202 close their respective electrical circuits to activate and set (or arm) the alarm system of the pin alarm tag 100. It should be noted that the radial protrusion 252 of the underneath surface 250 of the grip section 230 is fully inserted and housed inside a cavity 254 (best illustrated in FIG. 2E), surrounded by the periphery wall 256 of the cavity 254. The periphery wall 256 of the cavity 254 further protects the fastener plug member 102 against tampering.

When either the fastener plug member 102 or the switch 202 are tampered and deactivated while the pin alarm tag 100 is armed and ON, the alarm system of the pin alarm tag 100 activates (or triggers) an alarm, thereby preventing bypassing of the alarm device. That is, for example, as best illustrated in FIG. 2B, if the fastener end 204 near the grip 230 is severed, the grip 230 will fall off to enable release and removal of an article. The fastener end 204 may be severed near the grip 230 while the rest of the lower section of the fastener end 204 continues to physically and electrically remain in contact with the alarm tag 100, without activating (or triggering) the alarm. However, severing the grip 230 will also remove the support for the inconspicuous auxiliary switch 202 underneath the grip 230, which maintains the switch 202 in a closed position. Accordingly, the fastener end 204 may be physically cut from outside the pin alarm tag 100 to disconnect the pin alarm tag 100 (near the grip 230) from the article (not shown) to which the alarm tag 100 is coupled, without actually fully removing the fastener plug member 102 out from the alarm tag 100, or trigger of any alarm. However, the switch 202 (which is biased out) will be activated (or opened), preventing circumvention of the alarm system. That is, if the faster plug member 102 is tampered, the inconspicuous auxiliary switch 202 opens to trigger the alarm.

It should be noted that an independent electrical circuitry is associated with the fastener plug member 102, and another independent electrical circuitry is associated with the inconspicuous auxiliary switch 202. Accordingly, the electrical circuit associated with the fastener plug member 102 remains in a closed-circuit condition if the fastener end 204 physically remains in contact with the its associated electrical circuit to generate a closed-circuit condition while the extended outside portion thereof that connects the article to the alarm tag 100 is cut, releasing the article without triggering an alarm. However, when fastener end 204 is severed near the grip 230 to release an article, there will be no grip 230 to press and support the switch 202 in its closed position, releasing the switch 202 to its biased protruded open position, which will trigger the alarm circuitry. That is, opening of the switch 202 generates an open-circuit condition in the independent electrical circuit associated with the switch 202, which triggers the alarm. Therefore, the alarm tag 100 of the present invention provides multiple switching and alarm circuits that can independently trigger an alarm, and function in conjunction together to prevent unauthorized disarming of the pin alarm tag 100.

Figure 3:
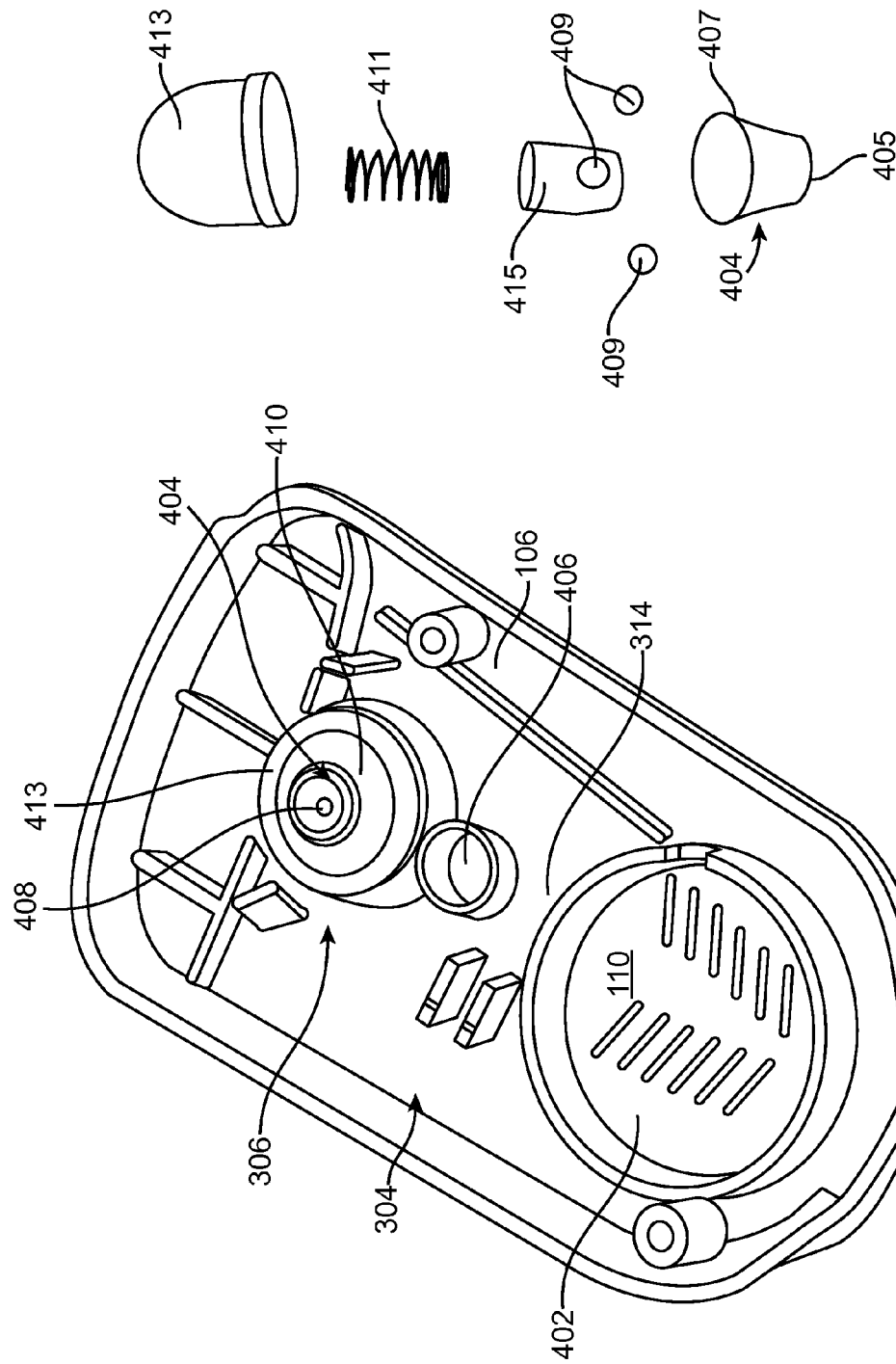
FIG. 3 is an exemplary illustration of a first internal chamber of a first member of the pin alarm tag of FIGS. 1A to 2E in accordance with the present invention.
Figure 4:
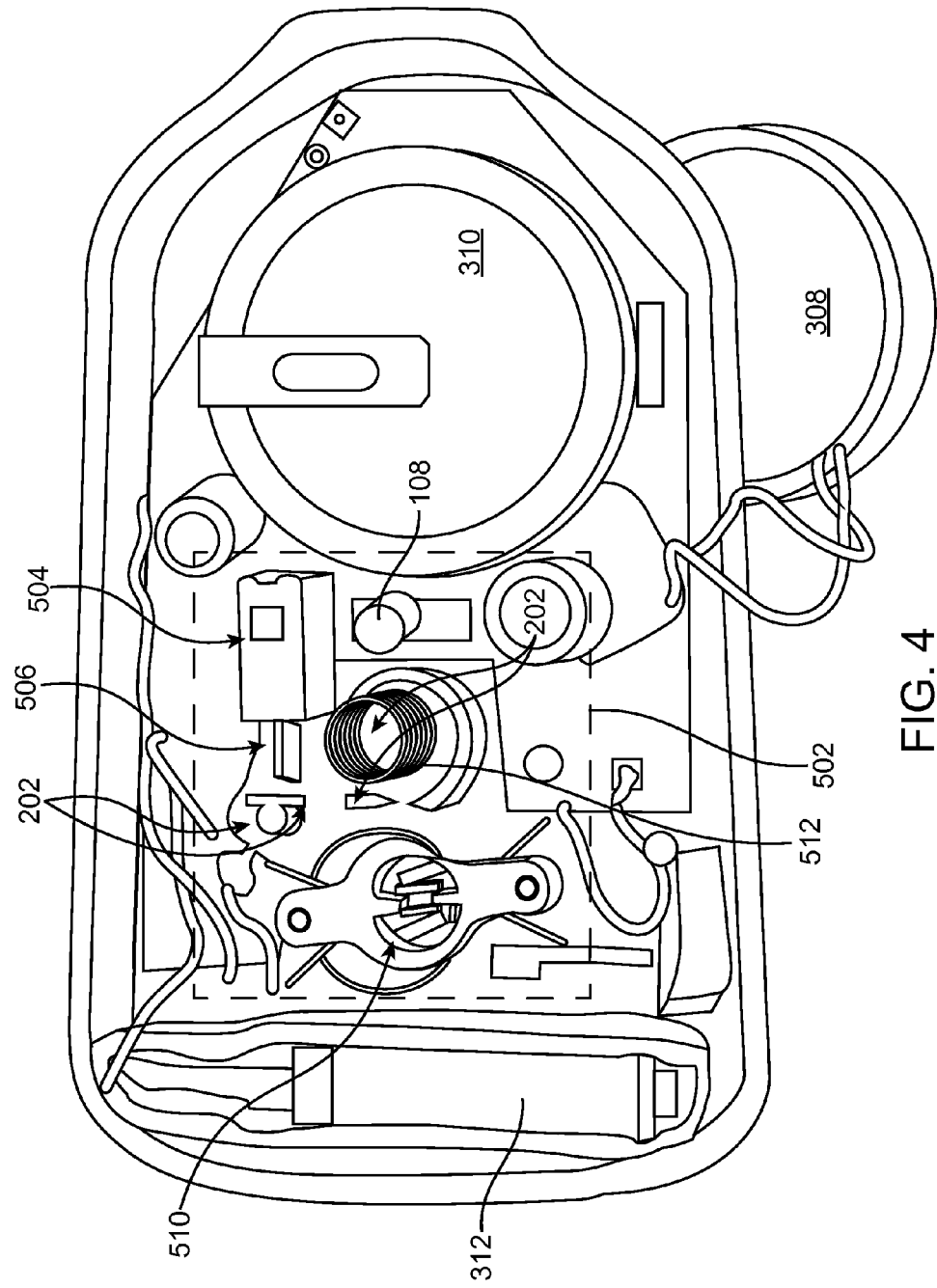
FIG. 4 is an exemplary illustration of mechanical interconnections and circuitry of an alarm system of the pin alarm tag of FIGS. 1A to 3 in a second internal chamber of a second member of the pin alarm tag in accordance with the present invention.

FIGS. 3 and 4 are exemplary illustrations of the pin alarm tag 100 with the housing 104 physically separated into its first member 106 (FIG. 3) and second member 120 (FIG. 4), including the internal chamber 304 of the first member 106 and the internal chamber 302 of the second member 120. The internal chamber 304 of the first member 106 includes lock mechanism 306 and a visual indicator aperture 314 for viewing of the visual indicator device 108 (housed in the internal chamber 302 of the second member 120). The transducer 308 (FIG. 4) is housed within cavity 402, and the remaining circuitry of the alarm system are housed in the internal chamber 302, including a power source and a well-known electronic article surveillance (EAS) tag 312.

As best illustrated in FIG. 3, the internal chamber 304 of the first member 106 houses the lock mechanism 306, which interlocks with the fastener end 204 of the fastener plug member 102. The lock mechanism 306 is within a concaved portion of the internal chamber 304, with the concaved portion externally forming the protuberance 114 (FIG. 1A) of the first member 106. The lock mechanism 306 includes a housing 404 (positioned within a polymer resin structure 413) having small top section 405 with an aperture 408 for receiving the fastener end 204. The housing 404 of the lock mechanism 306 includes oblique walls 410 that slope and couple the small top section 405 to a larger bottom section 407, forming a single piece, substantially cone configured housing 404. The housing itself internally includes metal pieces 409 that are biased towards the small top section 405 by a biasing mechanism (e.g., a spring 411), with the biasing mechanism located at the larger bottom section 407 that pushes the metal pieces 409 toward the small top section 405, forcing the metal pieces 409 to contact. It should be noted that the metal pieces (in non-limiting exemplary form of ball bearings) are positioned within a metal cylinder 415 that holds the ball bearings symmetrically in place. Nonetheless, the fastener end 204 of the fastener plug member 102 when inserted within the aperture 408 moves the metal pieces 409 away from each other and towards the sloped walls 410 of the housing 404, which compel and direct the metal pieces 409 down against the biasing mechanism 411 toward the larger bottom section 407, with the metal pieces 409 pushed and biased against the fastener end 204 of the fastener plug member 102, securely maintaining and frictionally locking the fastener end 204 therein. In fact, the greater the pull on the fastener plug 102, the higher the frictional force acts on it, which further prevents the fastener plug from being pulled out of aperture 408.

To release and unlock the fastener end 204 so to remove the fastener plug member 102, the pin alarm tag 100 is brought into contact with the magnetic detacher, which pulls in and forces the metal pieces toward the larger bottom section of the housing 404, against the push of the internal biasing mechanism. This moves the metal pieces away from the fastener end 204, relieving to reduce the frictional grip of the metal pieces with the fastener end 204 to enable removal and release of the fastener plug member 102. A non-limiting example of metal pieces used may comprise of ball bearings. As further illustrated, the chamber 304 further includes a substantially cylindrical protrusion 406 that accommodates a biasing mechanism 512 (FIG. 4) for the auxiliary switch 202, and includes the cavity 402 that accommodates the transducer 308.

FIG. 4 is an exemplary illustration of the mechanical interconnections and circuitry of the alarm system of the pin alarm tag 100 in the internal chamber 302 of the second member 120. In particular, FIG. 4 is an overview of the internal chamber 302 of the second member 120, illustrating one or more input periphery devices such as an electronic article surveillance (EAS) tag 312. The EAS tag 312 may be construed as a triggering unit that detects and or generates surveillance signals to trigger an alarm. The non-limiting examples of EAS tags may include a magnetically sensitive device, a Radio Frequency (RF) sensitive device, or others. A non-limiting example of a magnetic sensitive device is a signal detector in the form of a ferrite coil 312, and a non-limiting example of the surveillance signal may be a magnetic signal that is detected by the ferrite coil 312. Ferrite coils 312 are well-known, and can have various configurations, including different types of coil configurations. It should be noted that an EAS tag may actuate the alarm of the pin alarm tag 100 as well as actuating an external security system such as a security gate alarm (e.g., a security pedestal).

As illustrated in FIG. 4, the pin alarm tag 100 includes a plurality of independent mechanical and electrical circuitry respectively associated with the fastener plug member 102, the switch 202, the EAS tag 112, and the magnetic switch 605. When the fastener plug member 102 is fully inserted into the aperture 206, the fastener end 204 contacts a first contact mechanism 510, which is electrically coupled with the alarm system of the pin alarm tag 100. When the fastener end 204 of the fastener plug member 102 is coupled with the first contact mechanism 510, the combination of both form a closed switch that completes a circuit to form a closed-circuit for setting (or arming) the alarm system of the pin alarm tag 100. In addition, when switch 202 is closed, it contacts a plunger arm 506 of a plunger switch 504 for setting (or arming) the alarm. That is, when switch 202 is closed, it completes its respective electrical circuit for setting the alarm system. The general area illustrated by the dashed line indicated generally by the reference number 502 in FIG. 4 is illustrated in FIGS. 5A to 5F, which closely illustrates the mechanical and electrical connections of the components of the alarm system within the housing 104 of the pin alarm tag 100.

Figure 5A:
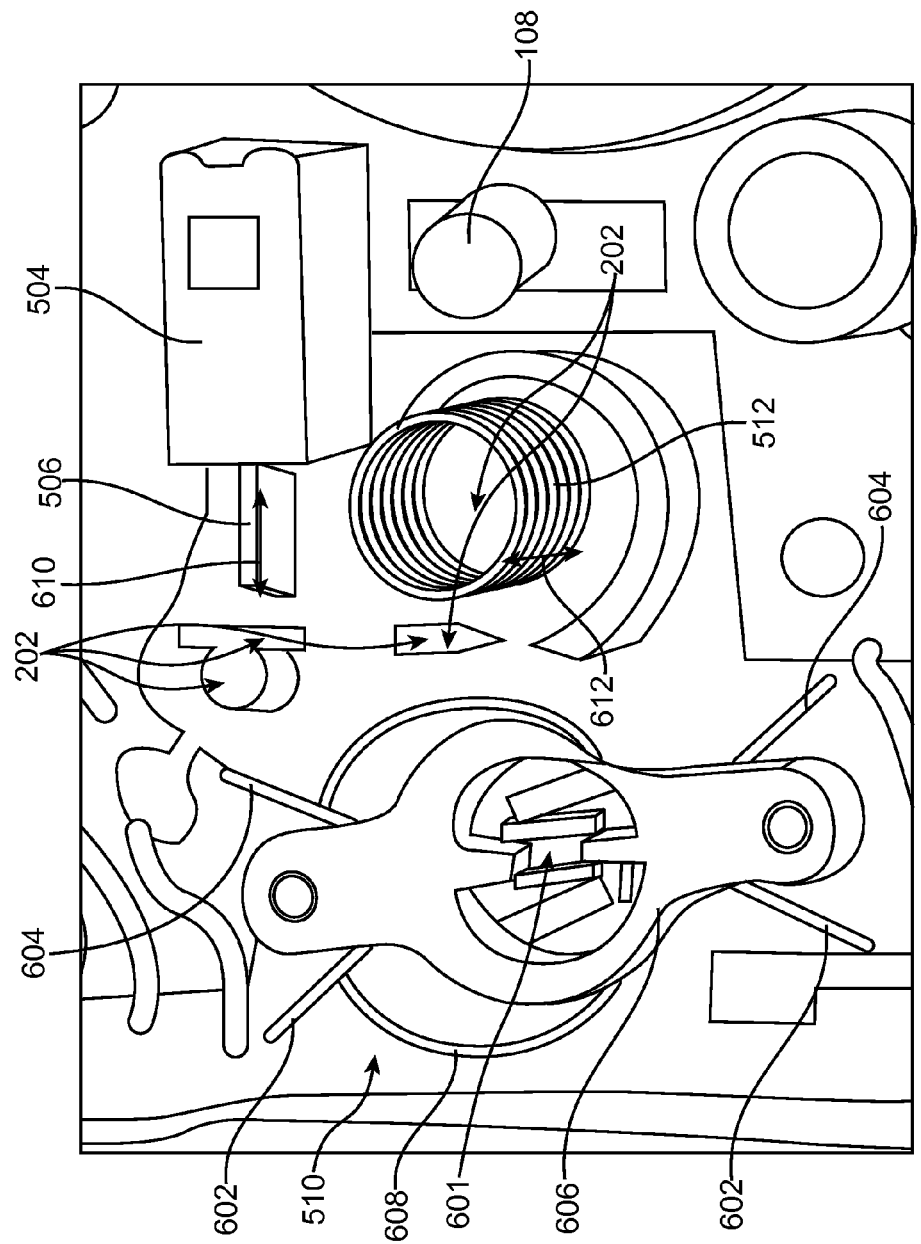
FIGS. 5A to 5F are enlarged close-up views of an area of a second internal chamber, which is shown in dashed line in FIG. 4 in accordance with the present invention.
Figure 5B:
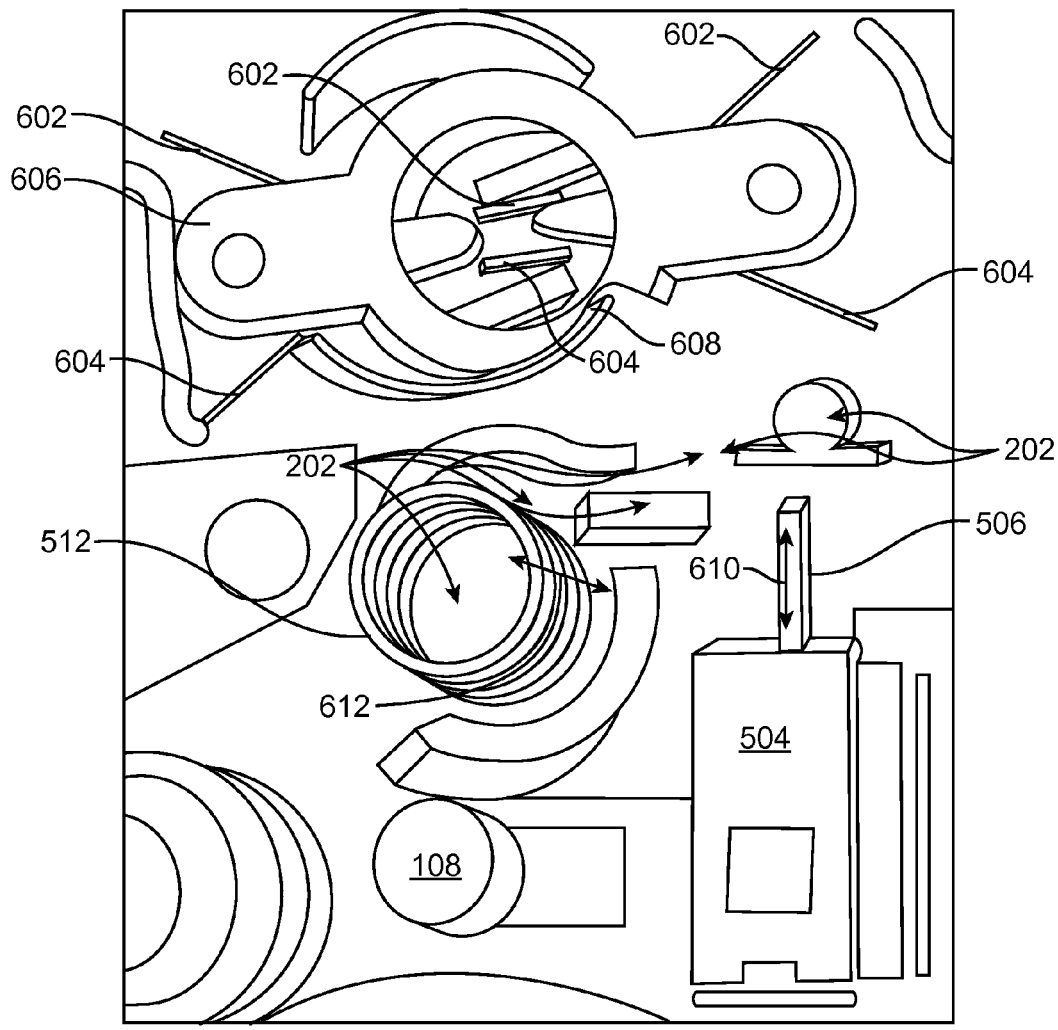
Figure 5C:
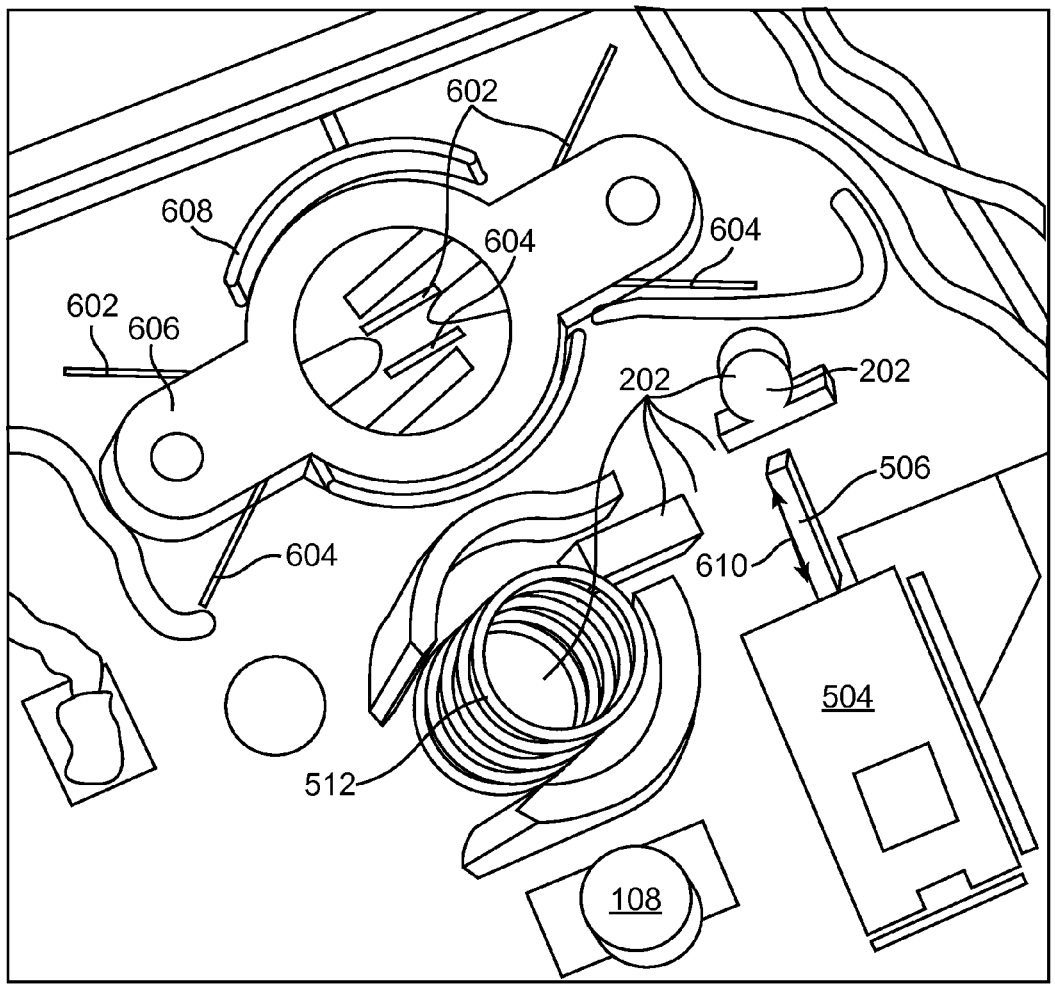
Figure 5D:
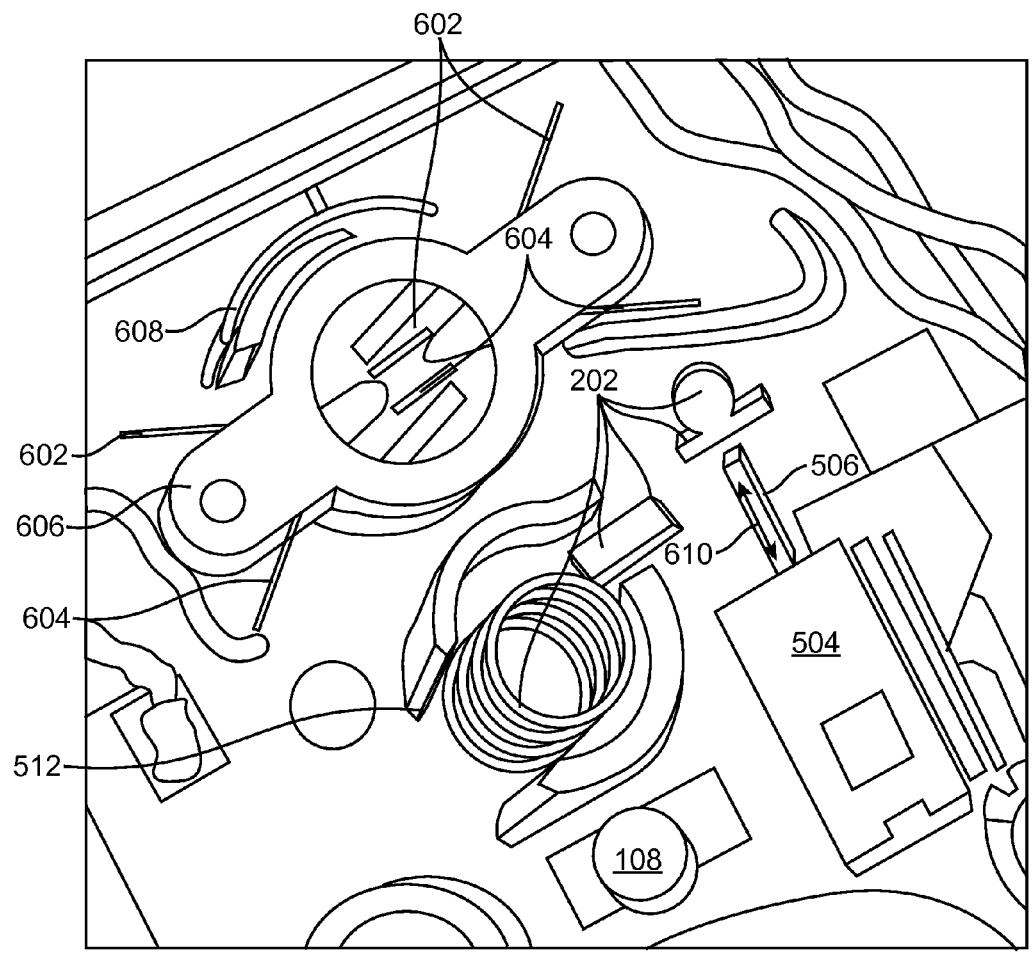
Figure 5E:
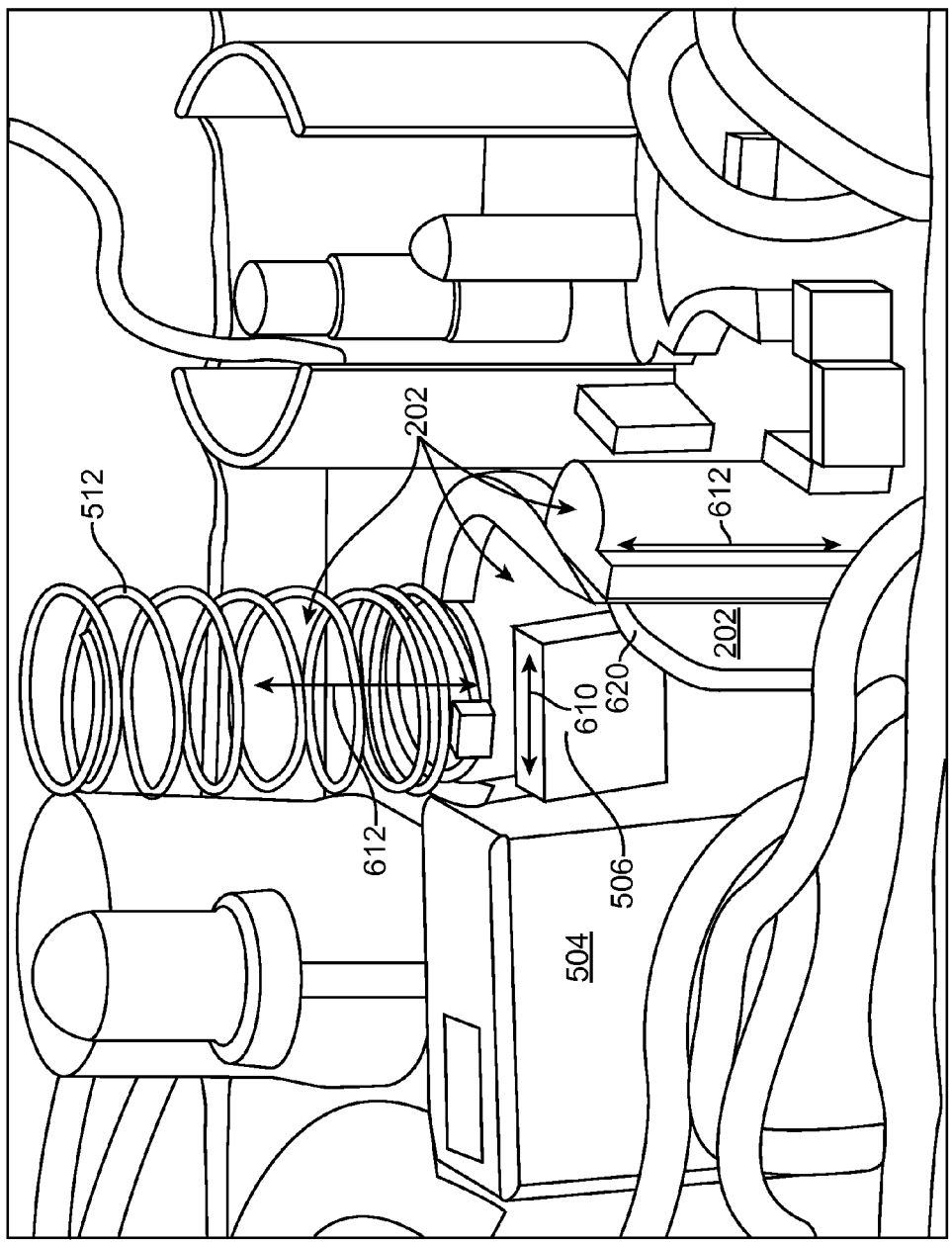
Figure 5F:
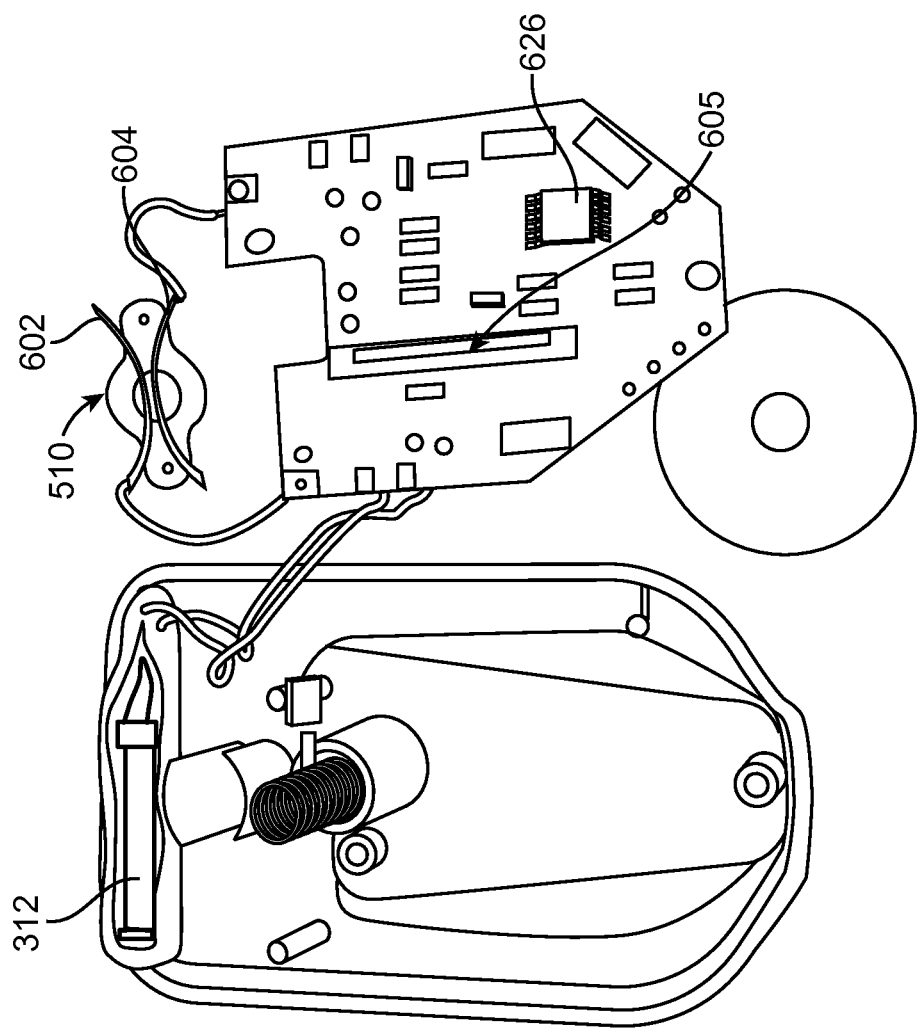

FIGS. 5A to 5F are enlarged close-up views of the area of second member 120, which is shown in dashed line 502 in FIG. 4. As illustrated in FIGS. 5A to 5F, the first connector mechanism 510 functions as a receptacle that accommodates the fastener plug member 102 inserted through the aperture 206 of the second member 120, with the fastener plug member 102 finally interlocked (frictionally) with the lock mechanism 306. The fastener end 204 is coupled with the first contact mechanism 510 that is electrically coupled with the alarm system of the pin alarm tag 100. The first contact mechanism 510 is comprised of a receptacle structure 606 that is secured within a receptacle chamber 608, with the receptacle structure 606 including a first contact 602 and a second contact 604 that are separated by a gap 601 that accommodates the fastener end 204, and when inserted, the fastener end 204 closes the gap 601 between the first and the second contacts 602 and 604 to complete the electrical circuitry associated therewith and set (or arm) the alarm. As best illustrated in FIG. 5F, the respective first and the second contacts 602 and 604 have an axial length that longitudinally is substantially parabolic, with a base of the contacts facing one another to form the gap 601.

As further illustrated in FIGS. 5A to 5F, the internal chamber 302 houses the switch 202 that contacts the plunger arm 506 of the plunger switch 504 for setting the alarm. The switch 202 is coupled with the second member 120 and surrounded by a biasing mechanism 512 that biases the switch 202 to its open position, protruding from the second member 120 (best illustrated in FIG. 2E). As the switch 202 is pressed down, it pushes against the biasing mechanism 512, with the internal structure of the switch 202 (best illustrated in FIGS. 4 and 5A to 5E) actuating the plunger arm 506 of the plunger switch 504, which is electrically coupled with the alarm system of the pin alarm tag 100, the closure of which completes the circuit associated with the auxiliary switch 202 for setting (or arming) the alarm system of the alarm tag 100. As best illustrated in FIG. 5E, when the switch 202 is pushed from the exterior of the second member 120 to set (or arm) the alarm, the entire auxiliary switch 202 moves along the reciprocating path 612. The movement of the switch 202 along the reciprocating path 612 enables the beveled distal section 620 of the switch 202 to contact the plunger arm 506 to move the plunger arm 506 along its reciprocating path 610. This closes the plunger switch 504, the closure of which completes the circuit associated with the switch 202 for setting (or arming) the alarm system of the pin alarm tag 100. Accordingly, the insertion of the fastener plug member 102 and the actuation of the auxiliary switch 202 sets (or alarms) the alarm system of the pin alarm tag 100. The magnetic detacher may be used to reset the EAS magnetic switch 605 (shown in FIG. 5F) and at the same time to release and unlock the fastener plug member 102 from the lock mechanism 306 and unplug it from the receptacle or first contact mechanism 510. The removal of the fastener plug member 102 in turn releases the switch 202, opening the plunger switch 504. FIG. 5F includes an exemplary illustration of a well-known magnetic switch 605, non-limiting example of which may include a hall effect switch, reed switch, or any other magnetic or proximity switches or any combinations thereof. When closed, the magnetic switch 605 resets (disarms) the alarm system and when open, maintains the status quo.

Figure 6A:
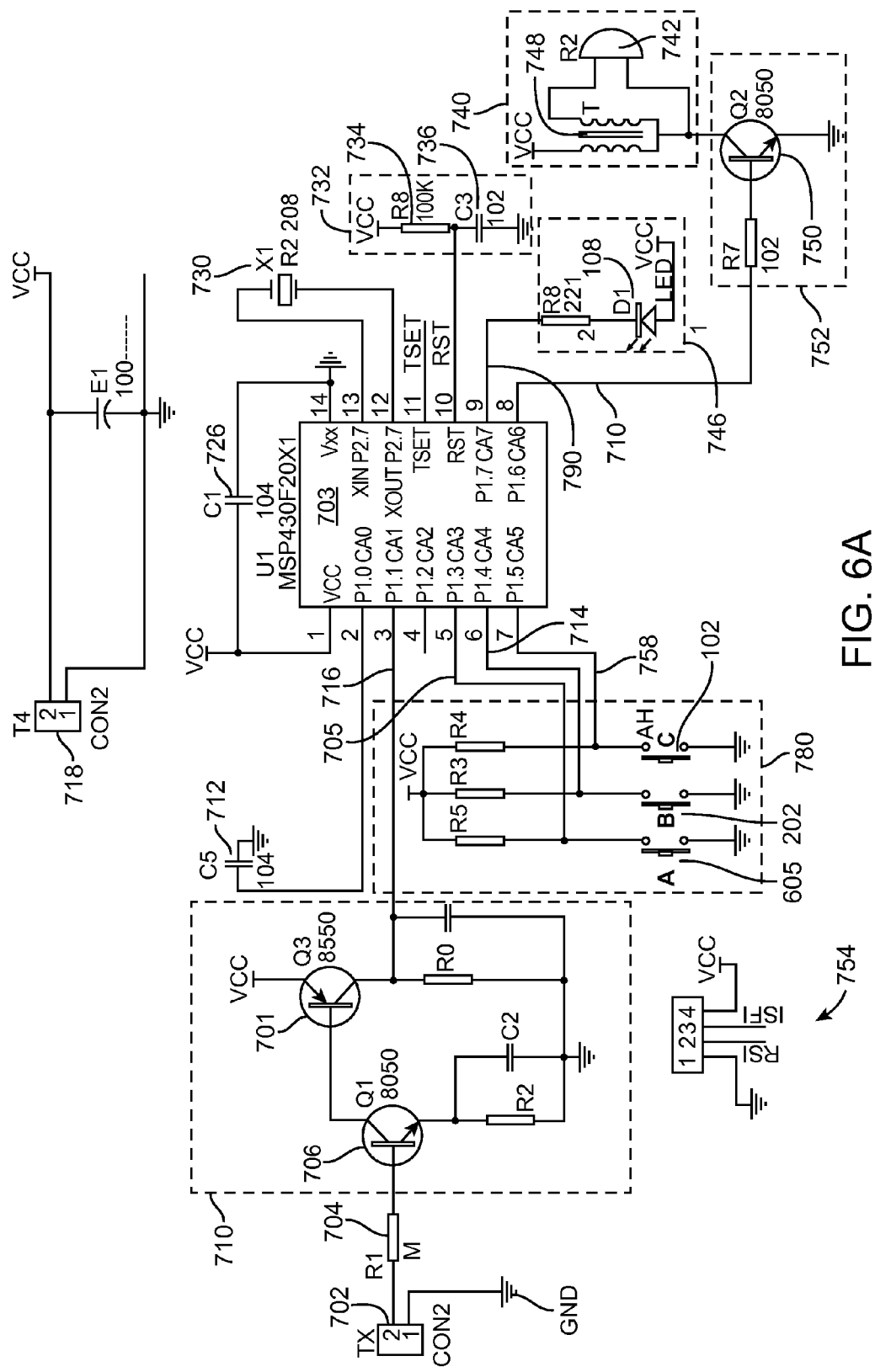
FIGS. 6A and 6B are exemplary schematic illustrations of an alarm system of the present invention in accordance with the present invention.
Figure 6B:
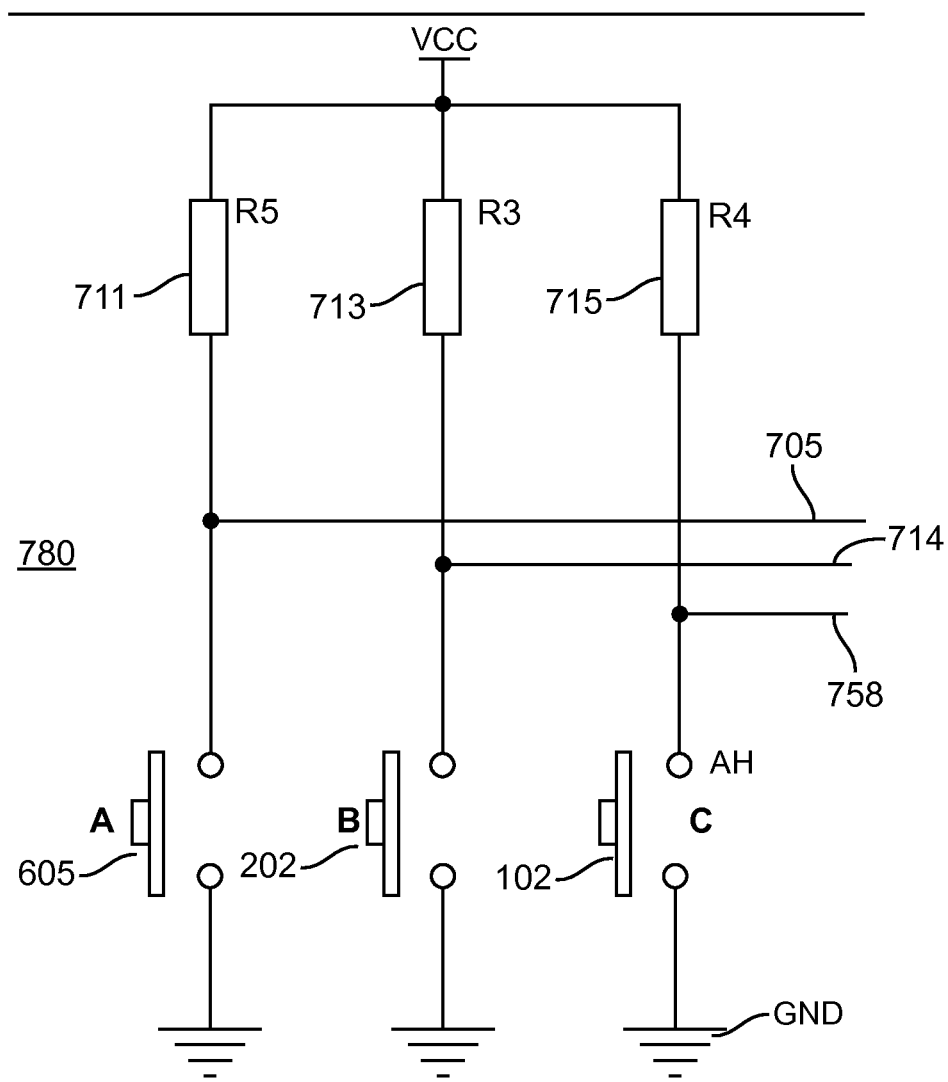

As stated above, the pin alarm tag 100 includes a plurality of independent mechanical and electrical circuitry respectively associated with the magnetic switch 605, the fastener plug member 102, the auxiliary (or secondary) switch 202, and the EAS system in the form of the EAS tag 312. That is, the magnetic switch 605 (a first input unit) has associated with it a first independent mechanical and electrical circuitry, the fastener plug member 102 (a second input unit) has associated with it a second mechanical and electrical circuitry, the inconspicuous auxiliary switch 202 (a third input unit) has associated with it a third mechanical and electrical circuitry and finally, the EAS system (a fourth input unit) has associate with it a fourth mechanical and electrical circuitry. FIGS. 6A and 6B are exemplary schematic illustrations of the alarm system of the present invention, including all input units and their respective associated circuitry. In FIG. 6A, the dashed line indicated as reference 780 is best illustrated in FIG. 6B, which represents the fastener plug member 102 (and the associated first contact mechanism (or receptacle) 510, the switch 202 (with the associated plunger mechanism 504/506), and the magnetic switch 605. As illustrated in FIGS. 6A and 6B, to activate the pin alarm tag 100, the fastener plug member 102 is inserted through the aperture 206 within the housing 104, with the fastener end 204 contacting the first contact mechanism (receptacle) 510, which closes the gap 601 to close the "switch C" illustrated in FIGS. 6A and 6B. The closing of the switch C pulls to ground the power Vcc at one end via a current limiting resistor 715. When the switch C is closed, the output of the first contact mechanism 510 is pulled low and set to "0," and inputted to a first input line 758 of one or more input lines of a microprocessor 703 for activation (or arming) of the alarm device of the pin alarm tag 100. As best illustrated in FIG. 6B, the mechanical plug/receptacle arrangement 102/510 is schematically represented by the switch C. It should be noted that the switch C is virtual and is for illustrative purpose only. Switch C is used only to represent the open and closed circuit conditions of the plug/receptacle arrangement 102/510. Accordingly, the illustrated switch C is a representation of open or closed condition of a circuit plug/receptacle 102/510.

As illustrated in FIGS. 6A and 6B, the "switch B" represents the auxiliary switch 202/plunger 504 combination. To activate (or arm) the pin alarm tag 100, the switch 202 is pushed from the exterior of the second member 120 to set (or arm) the alarm, with the entire switch 202 moving along the reciprocating path 612 (FIGS. 5A to 5E). The movement of the switch 202 along the reciprocating path 612 enables the beveled distal section 620 of the switch 202 to contact the plunger 506 to move the plunger 506 along its reciprocating path 610. This closes the plunger switch 504, the closure of which completes a circuit (closing of the switch B represented in FIGS. 6A and 6B) for setting (or arming) the alarm system of the alarm tag 100. The closing of the switch B pulls to ground the power Vcc at one end via a current limiting resistor 713. When the switch B is closed, the output of switch B is pulled low and set to "0," and inputted to a second input line 714 of one or more input lines of a microprocessor 703 for activation (or arming) of the alarm device of the pin alarm tag 100. The "switch A" illustrated in FIGS. 6A and 6B represents the switch magnetic switch 605 (illustrated in FIG. 5F). When the pin alarm tag 100 is brought into contact with the magnetic detacher, the magnetic switch 605 is reset (or closed—the representative "switch A" closes, with line 705 pulled to low ("0")). This enables the alarm system to be reset, deactivating the entire alarm system to OFF (if switch 102 is out and the switch 202 is open). Open switches "A" and "B" respectively represent the out condition of switch 102 and the open condition of switch 202).

As further illustrated in FIGS. 6A and 6B, the alarm system includes a general-purpose microprocessor 703 (also shown in FIG. 5F and referenced as 626) mounted onto a PCB with an internal memory (e.g., an EEPROM) that includes a set of instructions. The microprocessor 703 receives one or more input signals from one or more input periphery devices and generates one or more processed output signals for actuation of one or more periphery output devices. The processing of data may include Analog to Digital (A/D) or D/A conversion of signals, and further, each input or pin of the microprocessor 703 may be coupled with various multiplexers to enable processing of several multiple input signals from different input periphery devices with similar processing requirements. Non-limiting examples of one or more input periphery devices may exemplarily include the fastener plug member 102, the inconspicuous auxiliary switch 202, the magnetic switch 605, and the EAS tag 312. Non-limiting examples of one or more output periphery devices may exemplarily include the use of vibration mechanisms, audio, visual or any other indicators to alarm and notify a user regarding an occurrence.

As exemplarily illustrated in FIG. 6A, the pin alarm tag 100 may use a first input periphery device in the form of the electronic article surveillance (EAS) device coupled with an EAS connector 702, with the EAS device comprised of the EAS tag 312. As illustrated, a first output of the EAS connector 702 is coupled with ground GND, and a second output of the EAS connector 702 is coupled with an amplifier 710 to generate an amplified signal from the EAS tag 312. The amplifier 710 increases the signal strength form the ferrite unit of the EAS tag 312 sufficiently for further processing by the alarming circuit. The amplifier 710 is comprised of a current limiting resistor 704 that limits the current input to the base of the transistor 706, with the transistor 706 in combination with the transistor 701 functioning to amplify the signal (current and voltage) from EAS connector. The transistors 706 and 701 are comprised of an exemplary Bipolar Junction Transistors (BJT). It should be noted that present invention should not be limited to the amplifier 710 illustrated, and other conventional amplifiers may also be used. Further, the amplification need not be performed by the BJT, but can be done by other transistors, such as Metal Oxide Semiconductors (MOS) or MOS field effect transistors (MOSFETS), operational amplifiers, transformers, or the like, other passive or active devices, or any combinations thereof.

The amplifier 710 amplifies the output of the EAS tag 312, and the amplified signal (from the collector of the transistor 701) is input to the microprocessor 703 via the input line 716 as one of one or more input signals, where the microprocessor 703 converts the analog amplified signal into a digital signal for processing. This signal is translated by the instructions (algorithm) within the EEPROM of the microprocessor 703 to determine if the signal came from the transmitters (pedestals); if so, the microprocessor 703 trigger the alarm (e.g., audio and or visual indicators). It should be noted that one or more of the one or more processed output signals may be pulsed output signals on output line 710 to one of the one or more periphery output devices, for example, for actuation of a transducer unit 740 to generate an audio alarm signal.

The transducer unit 740 is actuated by an amplified pulsed output signal that is output from the microprocessor 703 via line 710, and further amplified by an output amplifier 752. The output amplifier 752 is comprised of a BJT transistor 750 with an emitter coupled to ground, a collector coupled to a transformer 748 of the transducer 740, and a base that is coupled with a current limiting resistor. The transistor 750 amplifies the pulsed output signal from line 710 to alternately drive the transformer from high Vcc to ground and vice versa, with the transformed pulsed signal driving a ceramic transducer 742 to generate an audible alarm. It should be noted that well-known software routine within the microprocessor 703 may generate this pulsed output, which is amplified by the transistor 750. In addition to the generation of an audible alarm, as further illustrated, other output periphery devices may include the use of a visual indicator 746 that use LEDs 108 to notify users of an occurrence. The visual indicator 746 is coupled with line 790 of the microprocessor 703. As indicated above, other output periphery devices not illustrated may also easily be accommodated and connected with the microprocessor 703.

As further illustrated, pins 1 and 14 of the microprocessor 703 are respectively coupled to Vcc and ground GND via a filter capacitor 726, which power the microprocessor 703. The power is supplied to the power connector 718 and provided as the power Vcc to the circuit. The microprocessor 703 is further coupled via its pin 2 to ground through another filter capacitor 712. The crystal 730 coupled to pin 13 is used to facilitate a clocking signal to the microprocessor 703. That is, it stabilizes the frequency of the clock in the microprocessor 703. Pins 10 and 11 are respectively for reset and test of the microprocessor 703, which is through a connector 754 that enables the testing and reset of the microprocessor 703. The testing and reset enable determination of signaling of the microprocessor 703, for example, to determine if the microprocessor 703 functions based on "0" or "1" input signal level to trigger a device. In this exemplary instance, the microprocessor 703 will trigger an output periphery device when the input is pulled to high (or "1"). For example, when the fastener plug member 102 is cut, the switch 202 is opened, pulling the line 714 to Vcc (high or "1"), which triggers an alarm. The reset pin 10 is coupled with the reset circuit 732, which includes a current limiting resistor 734 that is coupled at one end to Vcc and other end to a capacitor 736, with the other end of the capacitor 736 coupled to ground. The reset pin 10 is coupled at the junction of the resistor 734 and capacitor 736.

FIG. 7 is an exemplary flow chart, which illustrates the power management and functionality of the microprocessor 703 for the alarm tag 100. As illustrated, upon start of the program at the operational act 802, the microprocessor 703 initializes at the operational act 804. At the next operational act 806 the microprocessor 703 determines if the switch 102 and 202 (FIGS. 6A and 6B) are closed. If at the operational act 806 it is determined that the switches 202 and 102 are not closed, the microprocessor 703, at operational act 810, outputs a low power mode operational signal (e.g., sleep mode), with the operation reverting to initialization at operational act 804. If the microprocessor 703 determines that the switches 202 and 102 are closed, then at the operational act 812 the microprocessor 703 determiners if supplied power is greater than a first threshold level. If at the operational act 812 it is determined that supplied power is not greater than a first threshold level, the device becomes non-functional. Otherwise, if at the operational act 812 the microprocessor 703 determines that supplied power is greater than the first threshold, the microprocessor 703, at the operational act 816, determines if the supplied power is greater than a second threshold level, with the second threshold level being greater than the first threshold level. If the microprocessor 703 determines that the supplied power is not greater than a second threshold level, the microprocessor 703 at the operational act 818 activates various output periphery units in a predetermined manner to indicate low supply of power, but continues and arms the alarm tag to protect an article. If the microprocessor 703 determines that the supplied power is greater than the second threshold level, the alarm tag is set (or armed), and various indicators are activated to indicate to users that the article is protected.

To continue with the flowchart of FIG. 7, the microprocessor 703 at the operational act 822 determines if an antenna signal is received from associated EAS equipment. If the microprocessor 703 determines that an antenna signal is received, at the operational act 824, the microprocessor 703 activates an alarm. A non-limiting example for such an alarm incident (or condition) is the actual removal of the article to which the pin alarm tag 100 is connected from a store, passing them through a surveillance zone. This will activate the EAS tag unit 312 to trigger a signal, which will be amplified and input to the microprocessor to activate (or trigger) the alarm. Further, at the operational act 801 the microprocessor 703 determines if the auxiliary switch 202 is open. A non-limiting exemplary reason for checking to determine if the switch 202 is open at the operational act 801 after an alarm incident (at the operational act 824) is that, may be an actual authorized person is in the process of properly disarming the pin alarm tag 100 after an alarm incident at the operational act 824. That is, the pin alarm tag 100 and the article to which the tag 100 is coupled are brought to an authorized store personal to be properly disarmed. If at the operational act 801 it is determined that, the switch 202 is not open, at the operational act 824 the alarm is continuously activated. In other words, the pin alarm tag 100 has still not been disarmed. Otherwise, it is most likely that the fastener plug member 102 has been removed and the switch 202 is open. In the case where the switch 202 is open, the operational act 844 is executed where the microprocessor 703 determines if the magnetic switch 605 is closed by the magnetic detacher. That is, for example, the fastener plug member 102 is removed (either by an authorized person or tampered—severed), the switch 202 is open, and the microprocessor 703 now determines if the magnetic switch 605 of the tag 100 is closed by a magnetic detacher. In other words, has an authorized personal properly neutralized the magnetic switch 605 to initialize the pin alarm tag 100 using the magnetic detacher. If so, then the pin alarm tag 100 and its microprocessor 703 initialize (i.e., execute operational act 804). That is, the fastener plug member 102 is removed properly, the switch 202 is open, and the magnetic switch 605 is now closed by the magnetic detacher and therefore, the pin alarm tag 100 is properly neutralized wherein the microprocessor 703 reverts to the operational act 804. Otherwise, the pin alarm tag 100 continuously alarms. That is, at the operational act 801, it is determined that the auxiliary switch 202 is open (while, may be) the fastener plug member 102 is tampered. That is, the grip 230 of fastener plug member 102 is severed, which releases (opens) the auxiliary switch 202, triggering the alarm.

Referring back to the operational act 822, if the microprocessor 703 determines that no antenna signal was received at the operational act 822, the microprocessor 703, at the operational act 840 determines if the switch 202 is open and at the operational act 842, it determines if the fastener plug member 102 has been removed. If the microprocessor 703 determines that the switch 202 is open and or the fastener plug member 102 is removed, at the operational act 844 the microprocessor determines if the magnetic switch 605 has been closed by the magnetic detacher. If so, microprocessor 703 is initialized (operational act 804). Otherwise, an alarm is triggered at operational act 824, which indicates an actual tampering of the tag 100. On the other hand, if the microprocessor 703 determines that the fastener plug member 102 and the switch 202 are closed, at functional act 830 a determination is made regarding a timer to determine if a predetermined time has been reached. If at functional act 830 it is determined that a predetermined time has elapsed, an indicator is output and the timer is reset, where the microprocessor 703 then repeats operational functional act 822, which is to determine if an antenna signal has been received. The output indicator 832 is an audio and or visual indicator that enables a user to determine if the tag 100 is properly armed. The microprocessor 703 output a visual and or audio indicator periodically (while the tag 100 is armed) at specified predetermined time intervals T.

Although the invention has been described in considerable detail in language specific to structural features and or method acts, it is to be understood that the invention described and shown in the drawings should not be limited to the specific features or acts described and shown. Rather, the specific features and acts are disclosed as exemplary, preferred forms of implementing the invention. Stated otherwise, it is to be understood that the phraseology, terminology, and various measurements (if any) employed herein (and shown in drawings) are for the purpose of description and should not be regarded as limiting. Therefore, while exemplary illustrative embodiments of the invention have been described and shown, numerous variations and alternative embodiments will occur to those skilled in the art. For example, replacing the switches 102, 202, and 605 with infrared sensor circuit/switches, a motion detector circuit, an accelerometer circuit, a magnet detector circuit, a radiation detection circuit, any other types of sensor circuit or switch combinations thereof is possible. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An alarm tag, comprising:
   a first switch for resetting an alarm system of the alarm tag to OFF;
   a second switch and a third auxiliary switch, and
   a triggering unit that senses and detects surveillance signals to generate a detected surveillance signal that triggers an alarm; and
   when both the second and third auxiliary switches are actuated the alarm system of the alarm tag is armed and set to ON; and
   when any of the second and third auxiliary switch is deactivated while the alarm tag is armed and ON, the alarm system of the alarm tag activates an alarm, thereby preventing bypassing of one of the second and third switch to disarm the alarm;
   wherein the triggering unit is a signal detector that senses a surveillance signal and triggers the alarm system upon detecting the surveillance signal based on a predetermined set of switching of conditions of one or more of the first, second, and third switches.

2. The alarm tag as set forth in claim 1, wherein:
   the second switch is activated by a fastener that secures an article to the alarm tag.

3. The alarm tag as set forth in claim 2, wherein:
   the fastener includes a grip portion to enable a handling of the fastener, and a fastener end that is inserted through an article and inserted through an aperture of the alarm tag, interlocking the article with the alarm tag, with the fastener end coupled with a first contact mechanism that is electrically coupled with the alarm system of the alarm tag, the combination of which form a closed switch that completes a circuit for setting the alarm system of the alarm tag.

4. The alarm tag as set forth in claim 3, wherein:
   the fastener end couples within a lock of the alarm tag comprised of:
   a housing having small top section with an aperture for receiving the fastener end;
   oblique walls that slope and coupled the small top section to a larger bottom section, forming a substantially cone configured housing;
   the housing includes:
   metal pieces that are biased to the small top section by a biasing mechanism, with the biasing mechanism located at the larger bottom section that pushes the metal pieces toward the small top section, forcing the metal pieces to touch;
   the fastener end of the fastener when inserted within the aperture moves the metal pieces away from each other and towards the sloped walls of the housing, which compel and direct the metal pieces down against the biasing mechanism toward the larger bottom section, with the metal pieces pushed and biased against the fastener end of the fastener, securely maintaining and locking the fastener end therein frictionally.

5. The alarm tag as set forth in claim 4, wherein:
   the metal pieces are forced toward the larger bottom section of the housing by a magnetic field, moving the metal pieces away from the tip, reducing the frictional grip of the metal pieces with the tip to enable removal and release of the fastener.

6. The alarm tag as set forth in claim 5, wherein:
   the metal pieces are ball bearings within a metal cylinder that holds the ball bearings symmetrically in place.

7. The alarm tag as set forth in claim 3, wherein:
   the first contact mechanism is a receptacle and is comprised of a first contact and a second contact that are separated by a gap that accommodates the fastener, and when inserted, the fastener closes the gap between the first and the second contacts to set the alarm.

8. The alarm tag as set forth in claim 7, wherein:
the first and the second contacts have an axial length that longitudinally is substantially parabolic, with a base of the contacts facing one another.

9. The alarm tag as set forth in claim 1, wherein:
the third auxiliary switch is actuated in conjunction with the second switch to a closed position, which completes a circuit for arming the alarm system of the alarm tag.

10. The alarm tag as set forth in claim 1, wherein:
the first switch is a magnetic switch that when closed, resets and disarms the alarm if the second switch and the third auxiliary switch are open.

11. The alarm tag as set forth in claim 1, wherein:
the triggering unit is a signal detector that senses a surveillance signal and triggers the alarm system upon detecting the surveillance signal if the first switch is open and the second and third auxiliary switches are closed.

12. The alarm tag as set forth in claim 11, wherein:
the signal detector is a ferrite coil, and the surveillance signal is a magnetic signal that is detected by the ferrite coil.

13. An alarm system for an alarm tag, comprising:
a first input unit for resetting the alarm system;
a second input unit for coupling an article with the alarm tag and arming the alarm tag; and
an auxiliary input unit that is independent of the first and the second input units, but set in conjunction with the second input unit to one of a first condition and a second condition;
a triggering unit that senses and detects surveillance signals to generate a detected surveillance signal that triggers an alarm; and
where when both the second input unit and the auxiliary input unit are set to the first condition, the alarm system of the alarm tag is armed and set to ON; and
where when any of the second input unit and the auxiliary input unit is set to the second condition while the alarm tag is armed and ON, the alarm system of the alarm tag triggers an alarm;
wherein the triggering unit is a signal detector that senses a surveillance signal and triggers the alarm system upon detecting the surveillance signal based on a predetermined set of switching conditions of one or more of the first, second, and third switches.

14. The alarm system for an alarm tag as set forth in claim 13, wherein:
setting the second input unit to the first condition automatically sets the auxiliary input unit to the first condition, and setting the second input unit to a second condition sets the auxiliary input unit to the second condition.

15. The alarm system for an alarm tag as set forth in claim 14, further comprising:
a microprocessor that receives input signals from the first, the second, and the auxiliary input units, and a fourth input unit, and generates output signals that actuate one or more output units.

16. The alarm system for an alarm tag as set forth in claim 15, wherein:
the first input unit is a first sensor switch that outputs a first signal when closed to reset and disarm the alarm tag and generates a second signal when open to maintain status quo;
the second input unit is an interlock sensor switch that outputs a third signal when closed, coupling an article with the alarm tag and arming the alarm tag, and generates a fourth signal when open to trigger an alarm;
the auxiliary input unit is an auxiliary sensor switch that outputs a fifth signal when closed to arm the alarm tag, and generates a sixth signal when open to trigger an alarm; and
the fourth input unit is a triggering unit that generates a seventh signal to trigger an alarm.

17. The alarm system for an alarm tag as set forth in claim 16, wherein:
the triggering unit is a ferrite coil that detects a magnetic surveillance signal and generates the seventh signal for triggering an alarm if the second and auxiliary input units are closed.

18. The alarm system for an alarm tag as set forth in claim 17, wherein:
the seventh signal is amplified by an amplifier for further processing.

19. The alarm system for an alarm tag as set forth in claim 18, wherein:
the microprocessor is initialized when the first signal is received.

20. An alarm system for an alarm tag, comprising:
a first sensor switch for resetting the alarm system of the alarm tag to OFF;
a second interlocking sensor switch for coupling an article with the alarm tag and arming the alarm tag; and
a third auxiliary sensor switch that is independent of the first sensor switch and the second interlocking sensor switch, but set in conjunction with the second interlocking sensor switch to arm the alarm tag;
where when both the second interlock sensor switch and the third auxiliary sensor switches are closed, the alarm system of the alarm tag is armed and set to ON; and
where if the second interlocking sensor switch is tampered, the third auxiliary sensor switch opens to trigger the alarm;
wherein the triggering unit is a signal detector that senses a surveillance signal and triggers the alarm system upon detecting the surveillance signal based on a predetermined set of switching conditions of one or more of the first, second, and third switches.

21. The alarm system for an alarm tag as set forth in claim 20, wherein:
closing of the second interlocking sensor switch automatically closes the third auxiliary sensor switch to arm the alarm tag, and tampering with the second interlocking sensor switch opens the third auxiliary sensor switch.

22. An alarm system for an alarm tag, comprising:
a plurality of input units associated with a corresponding plurality of independent mechanical and electrical circuitry, including:
a first input unit that outputs a first signal to reset and disarm the alarm tag and generates a second signal to maintain status quo, with the first and second signals processed through a first independent mechanical and electrical circuitry;
a second input unit that outputs a third signal to arm the alarm tag, and generates a fourth signal to trigger an alarm, with the third and fourth signals processed through a second mechanical and electrical circuitry;
a third input unit that outputs a fifth signal to arm the alarm tag, and generates a sixth signal to trigger an alarm; with the fifth and sixth signal processed through a third mechanical and electrical circuitry; and a fourth input unit that generates a seventh signal to trigger an alarm, with the seventh signal processed through a fourth mechanical and electrical circuitry;

wherein the alarm is triggered based on a predetermined set of inputting conditions of one or more of the first, second, and third input units.

23. An alarm system for an alarm tag as set forth in claim 22, wherein:

the first input unit is a first sensor switch, comprised of a magnetic switch;

the second input unit is an interlocking sensor switch;

the third input unit is an inconspicuous auxiliary switch that is set in conjunction with the interlocking sensor switch to arm the alarm tag; and the fourth input unit is a triggering unit that senses and detects surveillance signals to generate the seventh signal that triggers an alarm; and where when both the interlock sensor switch and the auxiliary switch are closed, the alarm system of the alarm tag is armed and set to ON; and where if the interlocking sensor switch is tampered, the auxiliary switch opens to trigger the alarm.

24. The alarm tag as set forth in claim 3, wherein:

a radial protrusion of an underneath surface of the grip section is fully inserted and housed inside a cavity, surrounded by periphery wall that protects the fastener plug member against tampering.

* * * * *